US011332138B2

(12) United States Patent
Heap et al.

(10) Patent No.: US 11,332,138 B2
(45) Date of Patent: May 17, 2022

(54) METHOD OF OPERATING A POWERTRAIN SYSTEM DURING COASTING OPERATION

(71) Applicant: GM GLOBAL TECHNOLOGY OPERATIONS LLC, Detroit, MI (US)

(72) Inventors: Anthony H. Heap, Ann Arbor, MI (US); Jordan Billet, Ann Arbor, MI (US)

(73) Assignee: GM Global Technology Operations LLC, Detroit, MI (US)

(*) Notice: Subject to any disclaimer, the term of this patent is extended or adjusted under 35 U.S.C. 154(b) by 476 days.

(21) Appl. No.: 16/431,191

(22) Filed: Jun. 4, 2019

(65) Prior Publication Data
US 2020/0385002 A1 Dec. 10, 2020

(51) Int. Cl.
| | | |
|---|---|---|
| *B60W 30/18* | (2012.01) | |
| *B60W 20/00* | (2016.01) | |
| *F16H 63/40* | (2006.01) | |
| *B60T 8/172* | (2006.01) | |
| *B60T 7/04* | (2006.01) | |

(Continued)

(52) U.S. Cl.
CPC ....... *B60W 30/18072* (2013.01); *B60T 7/042* (2013.01); *B60T 8/172* (2013.01); *B60W 10/10* (2013.01); *B60W 10/101* (2013.01); *B60W 10/11* (2013.01); *B60W 10/184* (2013.01); *B60W 20/00* (2013.01); *F16H 63/40* (2013.01); *B60T 2201/00* (2013.01); *B60T 2270/82* (2013.01); *B60W 2710/10* (2013.01);

(Continued)

(58) Field of Classification Search
CPC .......... B60W 30/18072; B60W 10/10; B60W 10/101; B60W 10/11; B60W 10/184; B60W 20/00; B60W 2710/10; B60W 2710/18; B60W 10/026; B60W 30/18109; B60W 2710/1005; B60W 2710/105; B60W 2710/1055; B60T 7/042; B60T 8/172; B60T 2201/00; B60T 2270/82; B60T 2220/04; F16H 63/40; F16H 61/0213; B60Y 2200/92; B60Y 2300/18066; Y02T 10/60
USPC .......................................................... 701/70
See application file for complete search history.

(56) References Cited

U.S. PATENT DOCUMENTS

| | | | | |
|---|---|---|---|---|
| 7,908,067 B2* | 3/2011 | Soliman | .................. | B60K 6/52 |
| | | | | 180/65.265 |
| 2007/0179695 A1* | 8/2007 | Reinke | .................. | B60W 10/06 |
| | | | | 701/54 |

(Continued)

*Primary Examiner* — Jonathan M Dager
*Assistant Examiner* — Jean W Charleston
(74) *Attorney, Agent, or Firm* — Quinn IP Law

(57) ABSTRACT

A method of operating a powertrain system during coasting operation, wherein the powertrain system includes a driveline component (e.g., a transmission, drive shaft, differential, axle or wheel) having an output torque profile. The method includes: (i) determining a desired output torque transition profile for the driveline component between a first transition point before an end of a first state, and a second transition point after a beginning of a second state; and (ii) in response to a braking torque request, generating a friction braking torque command to operate a friction braking system, and adjusting the friction braking torque command during a transitional state between the first and second transition points by an amount corresponding to a difference between a magnitude of the output torque profile and a magnitude of the desired output torque transition profile.

18 Claims, 3 Drawing Sheets

(51) Int. Cl.
  *B60W 10/11*    (2012.01)
  *B60W 10/101*   (2012.01)
  *B60W 10/10*    (2012.01)
  *B60W 10/184*   (2012.01)

(52) U.S. Cl.
  CPC ...... *B60W 2710/18* (2013.01); *B60Y 2200/92* (2013.01); *B60Y 2300/18066* (2013.01)

(56) References Cited

U.S. PATENT DOCUMENTS

| | | | | |
|---|---|---|---|---|
| 2010/0197449 | A1* | 8/2010 | Imamura | B60K 6/365 |
| | | | | 180/65.265 |
| 2012/0109479 | A1* | 5/2012 | Ganley | B60L 7/18 |
| | | | | 701/70 |
| 2013/0297161 | A1* | 11/2013 | Gibson | B60W 30/18018 |
| | | | | 180/65.265 |
| 2014/0257653 | A1* | 9/2014 | Sato | B60W 50/14 |
| | | | | 701/55 |
| 2016/0375893 | A1* | 12/2016 | Nefcy | B60W 20/14 |
| | | | | 180/65.265 |
| 2018/0001884 | A1* | 1/2018 | Itagaki | B60K 6/445 |

* cited by examiner

METHOD OF OPERATING A POWERTRAIN SYSTEM DURING COASTING OPERATION

INTRODUCTION

This disclosure relates generally to methods of operating a powertrain system during coasting operation.

A vehicle powertrain may include a transmission having discrete gear ranges and/or step changes due to torque converter clutch (TCC) release, such as a step-gear transmission, a dual-clutch transmission (DCT), a continuously variable transmission (CVT) or a manual transmission, including hybrid powertrains which may include any of the foregoing types of transmissions. When the vehicle is being driven at highway cruising speeds, the driver may choose to remove his or her foot from the accelerator pedal and maintain his or her foot on or off the brake pedal, which is an operation mode known as "coasting". During such coasting operations, a fuel-saving feature known as deceleration fuel cut-off (DFCO) may be automatically engaged by the vehicle's powertrain control system, during which time the fuel supply to the engine is halted.

Under coasting (and optional DFCO) conditions, the vehicle will typically slow down, and the powertrain controller may cause the transmission to step down (i.e., downshift) through successively lower gears. If this process of coasting (with optional DFCO) and downshifting continues, a sufficiently low gear range (e.g., 3rd gear) and vehicle speed may be reached such that, for step-gear transmissions and CVTs, the TCC is released which may call for DFCO to cease if it had previously been enabled (i.e., the supply of fuel to the engine is resumed), while for DCTs DFCO ceases (i.e., fueling is resumed). And in the case of hybrid powertrains, the system could stay under DFCO even after TCC release, while an electric motor is engaged.

SUMMARY

According to one embodiment, a method of operating a powertrain system during coasting operation, wherein the powertrain system includes a driveline having a driveline output torque profile, includes: (i) determining a desired driveline output torque transition profile between a first transition point before an end of a first driveline state, and a second transition point after a beginning of a second driveline state; and (ii) in response to a braking torque request, generating a friction braking torque command to operate a friction braking system, and adjusting the friction braking torque command during a transitional driveline state between the first and second transition points by an amount corresponding to a difference between a magnitude $T_{out}$ of the driveline output torque profile and a magnitude $T_{desired}$ of the desired driveline output torque transition profile. The adjusting may include increasing the friction braking torque command when $T_{out}$ is greater than $T_{desired}$, and decreasing the friction braking torque command when $T_{out}$ is less than $T_{desired}$.

The driveline may include one of a step-gear transmission, a dual-clutch transmission, a continuously variable transmission and a manual transmission, and the powertrain system may include one of a hybrid propulsion system and a non-hybrid propulsion system. The driveline may include a transmission, wherein in the first driveline state, the transmission may be in a first gear state, and in the second driveline state the transmission may be in an adjacent gear state having a higher gear ratio than the first gear state, wherein the first driveline state after the first transition point, the second driveline state before the second transition point, and the transitional driveline state may occur during deceleration fuel cut-off conditions. In the transitional driveline state, the powertrain system may undergo at least one of (i) torque converter clutch release and (ii) transition from deceleration fuel cut-off to resumption of fuel delivery. The driveline may be at least one of a transmission, a drive shaft, a differential, at least one axle and at least one wheel.

The friction braking system may be a brake-by-wire system. The braking torque request may correspond to an operator brake pedal position, wherein the operator brake pedal position calls for substantially constant braking during the first driveline state, the second driveline state and the transitional driveline state.

According to one embodiment, a method of operating a powertrain system during coasting operation, wherein the powertrain system includes a transmission having a transmission output torque profile, includes: (i) determining a desired transmission output torque transition profile between a first transition point before an end of a first transmission state, and a second transition point after a beginning of a second transmission state; and (ii) in response to a braking torque request, generating a friction braking torque command to operate a brake-by-wire friction braking system, and adjusting the friction braking torque command during a transitional transmission state between the first and second transition points by an amount corresponding to a difference between a magnitude $T_{out}$ of the transmission output torque profile and a magnitude $T_{desired}$ of the desired transmission output torque transition profile, wherein the friction braking torque command is increased by $T_{out}-T_{desired}$ when $T_{out}$ is greater than $T_{desired}$, and decreased by $|T_{out}-T_{desired}|$ when $T_{out}$ is less than $T_{desired}$.

The transmission may include one of a step-gear transmission, a dual-clutch transmission, a continuously variable transmission and a manual transmission, and the powertrain system may include one of a hybrid propulsion system and a non-hybrid propulsion system. In the first transmission state, the transmission may be in a first gear state, and in the second transmission state the transmission may be in an adjacent gear state having a higher gear ratio than the first gear state, wherein the first transmission state after the first transition point, the second transmission state before the second transition point, and the transitional transmission state may occur during deceleration fuel cut-off conditions. In the transitional transmission state, the transmission may undergo at least one of (i) torque converter clutch release and (ii) transition from deceleration fuel cut-off to resumption of fuel delivery. The braking torque request may correspond to an operator brake pedal position, wherein the operator brake pedal position calls for substantially constant braking during the first transmission state, the second transmission state and the transitional transmission state.

According to one embodiment, a method of operating a powertrain system during coasting operation, wherein the powertrain system includes a driveline component having a driveline component output torque profile, includes: (i) determining a desired driveline component output torque transition profile between a first transition point before an end of a first driveline component state, and a second transition point after a beginning of a second driveline component state; and (ii) in response to a braking torque request, generating a friction braking torque command to operate a brake-by-wire friction braking system, and adjusting the friction braking torque command at a plurality of time points during a transitional driveline component state between the first and second transition points by an amount at each of the plurality of time points corresponding to a respective difference between a respective instantaneous magnitude $T_{i\text{-}out}$ of the driveline component output torque profile and a respective instantaneous magnitude $T_{i\text{-}desired}$ of the desired driveline component output torque transition profile. The friction braking torque command may be increased by $|T_{i\text{-}out}-T_{i\text{-}desired}|$ when $T_{i\text{-}out}$ is greater than $T_{i\text{-}desired}$, and decreased by $|T_{i\text{-}out}-T_{i\text{-}desired}|$ when $T_{i\text{-}out}$ is less than $T_{i\text{-}desired}$.

The driveline component may include one of a step-gear transmission, a dual-clutch transmission, a continuously variable transmission and a manual transmission, and the powertrain system may include one of a hybrid propulsion system and a non-hybrid propulsion system. The driveline component may be at least one of a transmission, a drive shaft, a differential, at least one axle and at least one wheel. The powertrain system may include a transmission, wherein in the first driveline component state, the transmission may be in a first gear state, and in the second driveline component state the transmission may be in an adjacent gear state having a higher gear ratio than the first gear state, wherein the first driveline component state after the first transition point, the second driveline component state before the second transition point, and the transitional driveline component state may occur during deceleration fuel cut-off conditions. In the transitional driveline component state, the powertrain system may undergo at least one of (i) torque converter clutch release and (ii) transition from deceleration fuel cut-off to resumption of fuel delivery. The braking torque request may correspond to an operator brake pedal position, wherein the operator brake pedal position calls for substantially constant braking during the first driveline component state, the second driveline component state and the transitional driveline component state.

DETAILED DESCRIPTION

Figure 1:
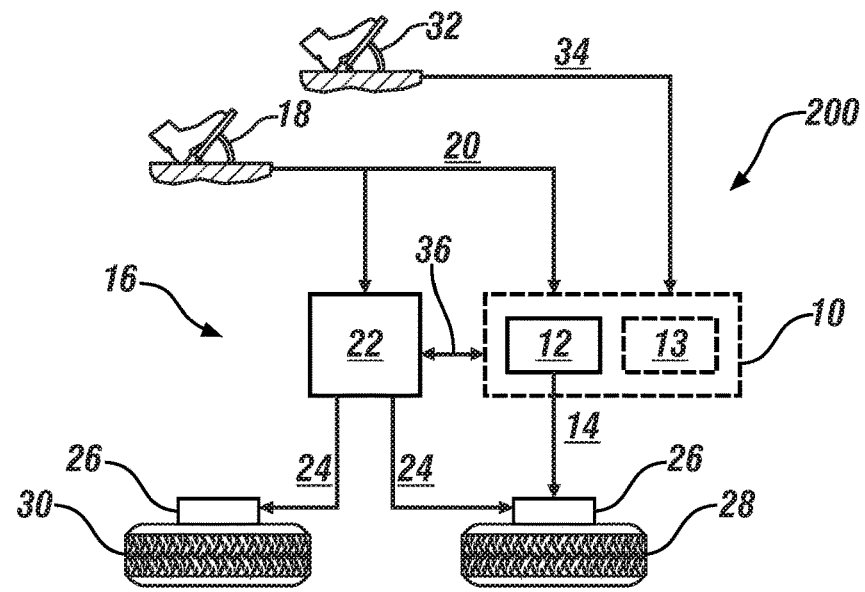
FIG. 1 is a schematic view of a portion of an exemplary vehicle configured to execute a control method in accordance with the disclosure.

Referring now to the drawings, wherein like numerals indicate like parts in the several views, a powertrain 10 and a method 100 of operating the powertrain 10 are shown and described herein.

FIG. 1 shows a schematic view of an exemplary vehicle 200 in accordance with the present disclosure. The vehicle 200 has a powertrain system 10 which includes a transmission 12 and various other powertrain subsystems and components 13, such as an engine, electric motors, battery, regenerative braking systems, torque converter, TCC, etc. The transmission 12 may include a step-gear transmission, a dual-clutch transmission, a continuously variable transmission or a manual transmission, and the powertrain system 10 may be a hybrid propulsion system or a non-hybrid propulsion system. The various components 13 of the powertrain system 10 may be operatively interconnected with each other and with the transmission 12. The vehicle 200 also includes a friction braking system 16 (e.g., a brake-by-wire system), which is described in more detail below.

The transmission 12 has an output 14 operatively connected to the drive wheels 28 of the vehicle 200 and optionally to the brakes 26 of the drive wheels 28. (Although not shown in the diagram, the output 14 may also be operatively connected to the other wheels 30 which would otherwise be non-driven wheels 30 if the output 14 were not operatively connected thereto. In hybrid or partially electrified vehicles 200, the brakes 26 may also include motor-generators which may be used for traction and regenerative braking.) The output 14 may be an item of hardware such as a drive shaft, or a signal which enables the wheels 28 (and optionally wheels 30) to be driven by the transmission 12 and/or some portion 13 of the powertrain system 10.

The powertrain system 10 receives an acceleration torque request 34 from an accelerator pedal 32 which is operated by a human operator. Optionally, the powertrain system 10 may also receive a braking torque request 20, such as from a brake pedal 18 which is also operated by a human operator. (Alternatively, the braking torque request 20 may come from a brake pedal sensor, another sensor, an algorithm or set of conditions, etc.) The braking torque request 20 is received by a braking module 22, such as an electronic braking control module (EBCM), which sends a friction braking torque command 24 to the friction brakes 26 of the drive wheels 28 and optionally to the friction brakes 26 of the non-driven wheels 30 as well. One or more components of the friction braking system 16, such as the braking module 22, may have a connection or interface 36 with the powertrain system 10. This connection 36 may be a one-way connection or a two-way connection between the braking system 16 and the powertrain system 10, and may take the form of hardware, software or some combination thereof. The connection 36 may interface with one or more portions of the powertrain system 10, such as the transmission 12 and/or other components 13 such as the engine, torque converter, TCC, etc., including one or more electronic control modules for these portions 12, 13 of the powertrain system 10.

Figure 2:
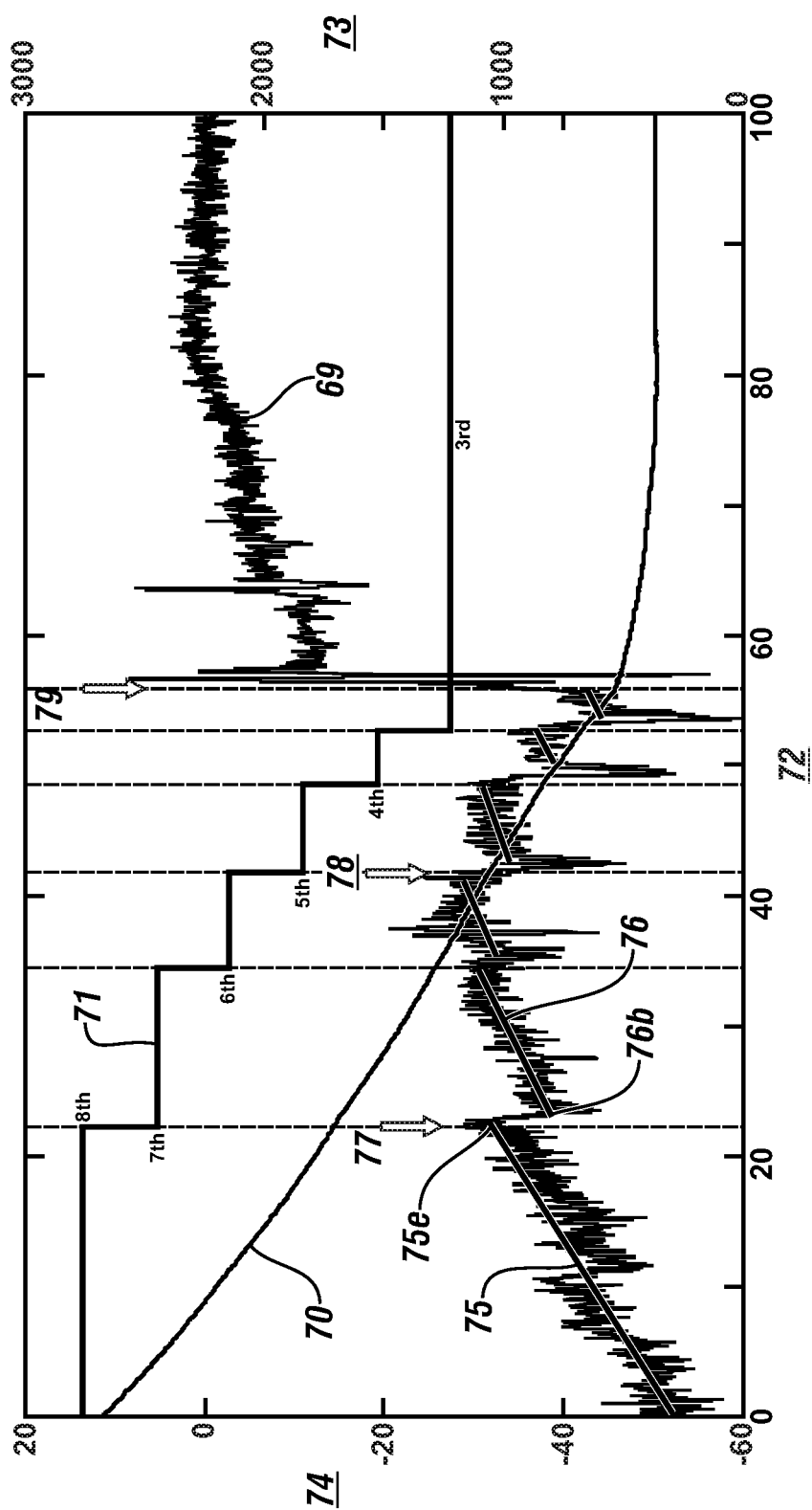
FIG. 2 shows plots of transmission output acceleration, transmission output speed and gear state versus time in accordance with the disclosure.

FIG. 2 shows plots of transmission output acceleration 69, transmission output speed 70 and gear state 71 versus time 72 during coasting conditions for a vehicle 200 without utilization of the method 100 of the present disclosure. The right vertical axis 73 measures transmission output speed 70 in units of revolutions per minute (rpm), the left vertical axis 74 measures transmission output acceleration 69 in units of revolutions per minute per second (rpm/sec), and the horizontal axis 72 measures time in units of seconds (sec). The transmission output acceleration plot 69 shows how the transmission output acceleration 69 varies over time as the transmission 12 downshifts during coasting conditions. Lines 75 and 76 show linear approximations of the transmission output acceleration 69 during $8^{th}$ and $7^{th}$ gears, respectively. Note that at arrow 77, there is a marked drop in acceleration 69 from the end 75e of $8^{th}$ gear 75 to the beginning 76b of $7^{th}$ gear 76. Also note that at arrow 78 a similar drop occurs in the transition from $6^{th}$ gear to $5^{th}$ gear (as well as in the transitions between other gears), and at arrow 79 an increase in acceleration occurs when the TCC releases and/or when DFCO ceases (i.e., "refuel" resumes). (Note that while TCC release and DFCO may occur at or near the same time in some powertrain or vehicle configurations, they are not necessarily related to or reliant upon one another, and each may occur independently from the other.)

Figure 3:
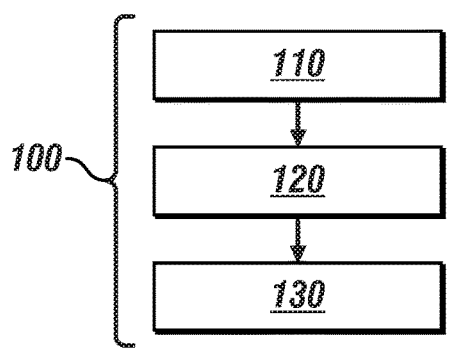
FIG. 3 is a flowchart of a method of operating a powertrain and vehicle system in accordance with the disclosure.
Figure 4:
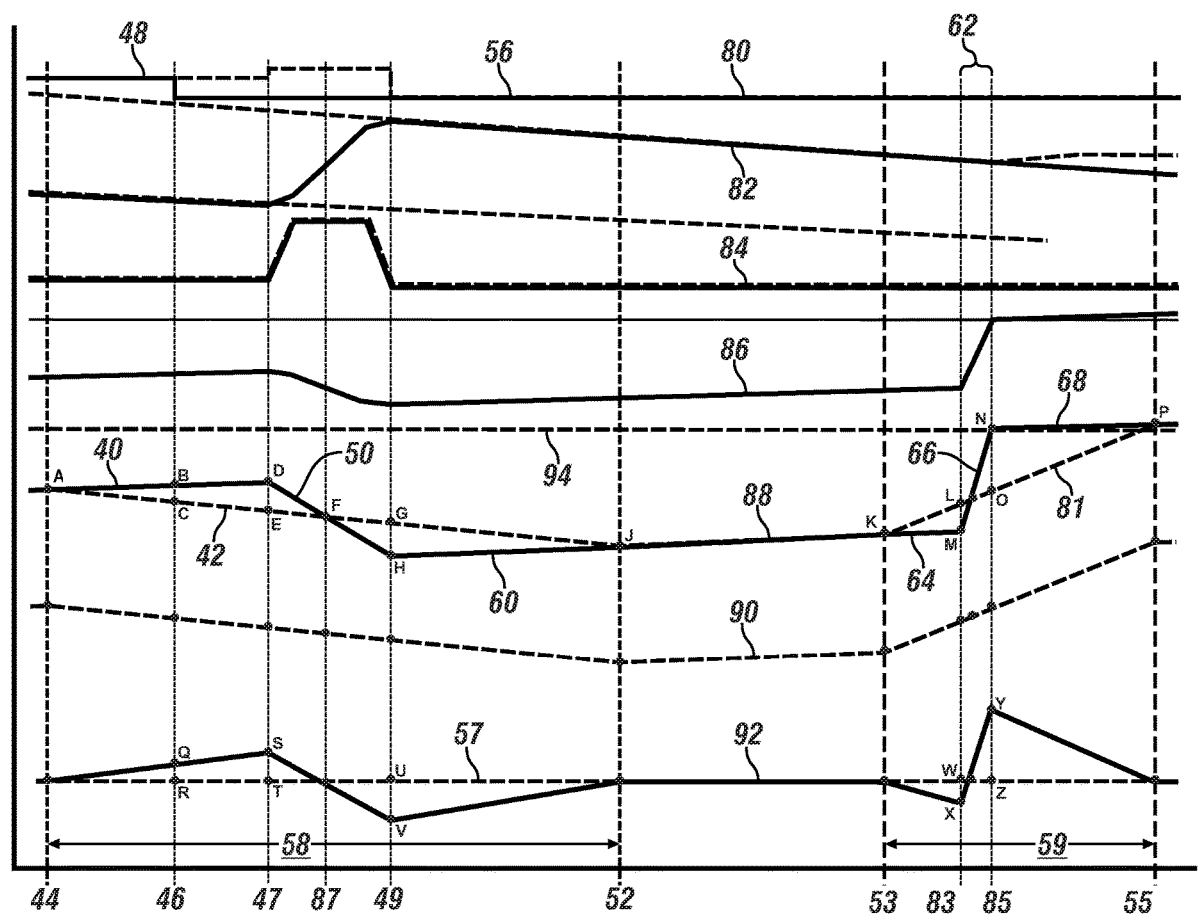
FIG. 4 graphically shows operation of a control method on vehicle transmission and braking systems in accordance with the disclosure.

The method 100 of the present disclosure addresses these changes in acceleration 69 that may occur during coasting due to downshifts and/or TCC release/refuel. FIG. 3 shows a flowchart for the method 100, and FIG. 4 shows a graphic representing operation of the method 100 with respect to various portions of the vehicle powertrain and braking systems 10, 16. The steps of the control method 100 will be described first with reference to FIG. 3, and then the steps will be described in terms of how they relate to the operation of the powertrain system 10 and braking system 16 as represented in FIG. 4. As mentioned, the control method 100 may be used in either or both of two coasting situations: downshifts (between vertical lines 44 and 52) and TCC release/refuel (between vertical lines 53 and 55). Each of these two situations will be described in detail separately, starting with downshifts.

The method 100 shown in FIG. 3 is for operating a powertrain system 10 during coasting operation, wherein the powertrain system 10 includes a transmission 12 having a transmission output torque profile 88 (i.e., a profile of the transmission output torque 14 over time). The method 100 includes a first step 110 of determining a desired transmission output torque transition profile 42 between (i) a first transition point 44 before an end of a first transmission state 48, and (ii) a second transition point 52 after a beginning of a second transmission state 56. A second step 120 includes, in response to a braking torque request 20, generating a friction braking torque command 24 to operate a friction braking system 16. And a third step 130 includes adjusting the friction braking torque command 24 during a transitional transmission state 58 between the first and second transition points 44, 52 by an amount corresponding to a difference between a magnitude $T_{out}$ of the transmission output torque profile 88 and a magnitude $T_{desired}$ of the desired transmission output torque transition profile 42. (That is, the amount corresponds to $|T_{out} - T_{desired}|$.) The adjusting step 130 may further include increasing the friction braking torque command 24 when $T_{out}$ is greater than $T_{desired}$, and decreasing the friction braking torque command 24 when $T_{out}$ is less than $T_{desired}$.

FIG. 4 graphically represents the operation of various portions of the powertrain system 10, the transmission 12 and the braking system 16 in accordance with the control method 100. The graphic includes time profiles for the requested gear state 80, the turbine speed 82, the desired turbine acceleration 84, the transmission input torque 86, the axle torque 94, the transmission output torque 88, the desired resultant output torque 90 for the vehicle propulsion system (e.g., the powertrain system 10 including the transmission 12, plus the braking system 16) and the friction braking torque 92. The horizontal axis of the graphic represents time, and specific points in time (corresponding to various kinematic events in the powertrain 10, transmission 12 and braking system 16) are noted by vertical lines 44, 46, 47, 87, 49, 52, 53, 83, 85 and 55. Note that various points on profiles 88 and 92 are identified by uppercase letters for ease of reference. In addition to these points, reference may be made to various line segments among these points. For example, in the transmission output torque profile 88, the line 40 between points A and D may be referred to as segment AD. Likewise, the line 50 between points D and H is segment DH, the segment between points H and J is segment HJ, and so forth.

Figure 5:
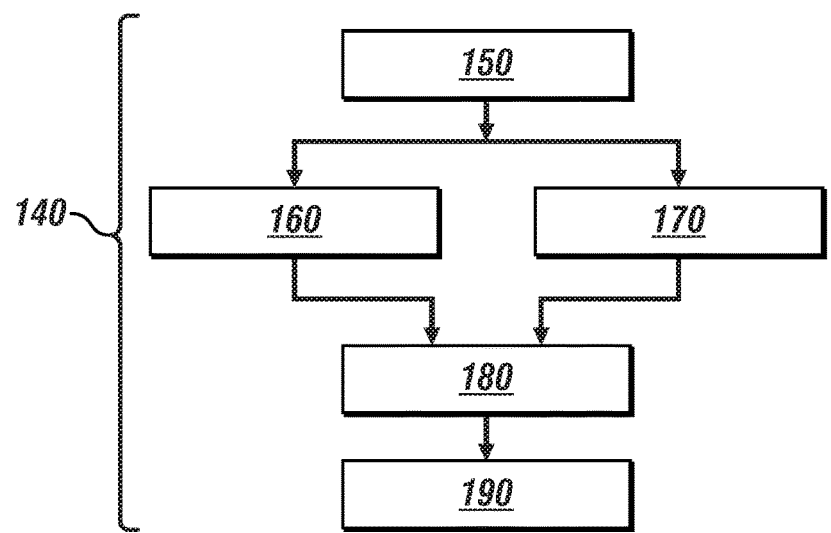
FIG. 5 is a flowchart of a method of determining a desired coast torque in accordance with the disclosure.

Without application of the present control method 100, the transmission output torque profile 88 may assume (or be expected to assume) a profile similar to the one shown in FIG. 4 as defined by solid line segments AD (line 40), DH (line 50), HJ (line 60), JK, KM (line 64), MN (line 66) and NP (line 68). In contrast, the dashed line segments AJ and KP represent portions of the desired transmission output torque transition profile 42, 81 which may be generated (or is desired to be generated) by the control method 100 of the present disclosure. (Note that while a specific set of profiles and operating conditions is shown in FIG. 4, this is merely for purposes of illustration, as the present method 100 may also apply to other profiles and operating conditions as well.) The regions of the transmission output torque profile 88 between vertical lines 44 and 52, and between vertical lines 53 and 55, which are shown in solid lines, may be the actual transmission output torque 14 produced by the transmission 12 (e.g., as sensed or detected by sensors), or they may be generated, prognosticated or predicted by various control methods, such as the coast torque algorithm 140 shown in FIG. 5. This algorithm 140 may be used to determine or define a transmission output torque profile 88 for use during vehicle coasting conditions. The algorithm 140 has a "START" at block 150, and an "END" at block 190. At block 160, the vehicle speed is determined, and at block 170 the driver-selected range or gear is determined. At block 180, a desired coast torque profile is formulated, which is a function of the vehicle speed and driver-selected gear range. The desired coast torque profile formulation step 180 may include use of one or more routines to perform calculations and/or to make choices from a static or dynamic look-up table (LUT). The calculations or LUT choices may utilize factory presets, firmware updates, historical vehicle data, diagnostic results, prognostics, and/or inputs from one or more sensors (for axle speed, turbine speed, transmission input or output speed, vehicle inclination, wheel-slip information from the braking or traction control systems, etc.), in order to produce the transmission output torque levels and torque profiles represented by solid line segments AD, DH, HJ, KM, MN and NP.

As indicated by the requested gear state profile 80, the transmission 12 is in a first gear state 48 up to the point in time represented by vertical line 46. At this point 46, a request is made for the transmission 12 to downshift to the second transmission state 56, which may be an adjacent (or non-adjacent) gear state having a higher gear ratio than the first gear state. For example, the first gear state may be "4$^{th}$ gear" and the adjacent gear state may be "3$^{rd}$ gear". As another example, the transmission 12 may sequentially downshift through successively lower gears (e.g., from 10$^{th}$ gear to 9$^{th}$, then to 8$^{th}$, then to 7$^{th}$, etc.). As a further example, the first and second gear states may be non-adjacent, such as a transmission 12 shifting from 7$^{th}$ gear in a first gear state to 5$^{th}$ gear or 4$^{th}$ gear in a second gear state (thereby skipping one or more adjacent gears.) However, due to the time required for certain kinematic events (e.g., the engagement and release of clutches and brakes in the transmission 12, the spin-up of the torque converter turbine, etc.), the gear state change requested at vertical line 46 may not occur immediately, and may take until the times represented by vertical lines 47 or 49 before the downshift to the next lower gear is completed. Thus, an "end" of the first transmission state 48 may occur at a time represented by vertical line 46, 47 or 49, or at a time between vertical lines 46 and 49. Likewise, a "beginning" of the second transmission state 56 (e.g., a requested lower gear) may begin at the time requested at vertical line 46, or at some time soon after, such as at vertical line 47 or 49, or at some point in time between vertical lines 46 and 49. Thus, vertical line 46 may represent a "nominal" point at which the transmission 12 moves from a first transmission state 48 to a second transmission state 56.

The desired transmission output torque transition profile 42 (shown as a dashed line) extends from a first transition point A, which is before the "end" of the first transmission state 48, to a second transition point J, which is after the "beginning" of the second transmission state 56. These transition points A, J may be selected, determined or preset in a variety of ways. For example, they may be selected by an electronic controller or algorithm as a result of one or more calculations and/or one or more choices from a static or dynamic look-up table (LUT). The calculations or LUT choices may utilize factory presets, firmware updates, historical vehicle data, diagnostic results, prognostics, and/or inputs from one or more sensors (for axle speed, turbine speed, transmission input or output speed, vehicle inclination, wheel-slip information from the braking or traction control systems, etc.), in order to determine past, current and anticipated conditions for the transmission 12, powertrain 10, braking systems 16 and/or vehicle 200. This may also include consideration of the aforementioned coast torque algorithm 140 or other algorithms to produce the transmission output torque level(s) and torque profile(s) such a coast torque algorithm 140 or other algorithms would call for. The method 100 utilizes these first and second transition points A, J to define a desired transmission output torque transition profile 42 between these points A, J, which would represent a desired smooth transition in transmission output torque 14 between the first and second transmission states 48, 56. (That is, during a transitional transmission state 58 defined as the state of the transmission 12 between the first transition point A and the second transition point J.) However, the method 100 does not call for a change in the transmission output torque 14 itself to achieve the desired transmission output torque profile 42; instead, the method 100 calls for a change in the friction braking torque command 24 in such a way as to yield the desired resultant output torque profile 90, which is a combination of the transmission output torque profile 88 and the friction braking torque 92. In other words, the method 100 of the present disclosure modifies the friction braking torque command 24 so as to compensate for the difference between the actual or expected transmission output torque profile (i.e., the solid lines 40, 50 and 60) and the desired transmission output torque profile (i.e., the dashed line AJ).

Normally, when a vehicle 200 is coasting and the driver has his or her foot on (or off) the brake pedal 18, the braking torque request 20 is generally constant (e.g., calling for 75 Nm of deceleration). This is represented by horizontal line 57 in FIG. 4, and this would normally represent a constant level of friction braking during coast. However, in step 130 of FIG. 3, the friction braking torque command 24 is adjusted during the transitional transmission state 58 between the first and second transition points in time 44, 52 (e.g., between points A and J) by an amount corresponding to a difference between a magnitude $T_{out}$ of the transmission output torque profile 88 and a magnitude $T_{desired}$ of the desired transmission output torque transition profile 42. (That is, the amount corresponds to $|T_{out}-T_{desired}|$.) The adjusting step 130 may further include increasing the friction braking torque command 24 when $T_{out}$ is greater than $T_{desired}$, and decreasing the friction braking torque command 24 when $T_{out}$ is less than $T_{desired}$. Note that while substantially constant braking has been described as an example above, the method 100 also applies to non-constant dynamic braking as well.

The method 100 may also include adjusting the friction braking torque command 24 at a plurality of time points during the transitional transmission state 58 between the first and second transition points A, J. For example, adjustments may be made every 1 millisecond between the time represented by vertical line 44 (e.g., at point A) and vertical line 52 (e.g., point J). Each adjustment to the friction braking torque command 24 may be by an amount at each of the plurality of time points corresponding to a respective difference between a respective instantaneous magnitude $T_{i-out}$ of the transmission output torque profile 88 and a respective instantaneous magnitude $T_{i-desired}$ of the desired transmission output torque transition profile 42. That is, the friction braking torque command may be increased by $|T_{i-out}-T_{i-desired}|$ when $T_{i-out}$ is greater than $T_{i-desired}$, and decreased by $|T_{i-out}-T_{i-desired}|$ when $T_{i-out}$ is less than T-desired.

For example, at the time represented by vertical line 46, the transmission output torque profile 88 has an instantaneous magnitude $T_{i-out}$ represented by point B, and the desired transmission output torque transition profile 42 has an instantaneous magnitude $T_{i-desired}$ represented by point C. The difference between these magnitudes $|T_{i-out}-T_{i-desired}|$ is represented by the vertical distance between points B and C (referred to as "distance BC" or "amount BC"), which corresponds to the vertical distance between points Q and R on the friction brake torque profile 92 (i.e., "distance QR" or "amount QR"). Note that point R lies on line 57—an exemplary constant amount of braking torque requested by the driver through the brake pedal 18—and that point Q represents an "additional" amount of braking torque above this otherwise constant exemplary level 57. (Note, however, as mentioned above that the amount of braking torque requested by the driver may also be non-constant or dynamic.) If the magnitude of distance BC or distance QR were subtracted from point B, the result would be point C. This could be effected by reducing the transmission output torque 14 at time point 46 by an amount BC or QR. But instead of doing this, the method 100 accomplishes essentially the same net result by increasing the friction braking torque command 24 by the amount QR. That is, decreasing the transmission output torque 14 by an amount BC, or increasing the friction braking torque command 24 by an amount QR, produces the same net effect as far as the vehicle propulsion torque is concerned.

Likewise, at time 47, rather than reducing the transmission output torque 14 by an amount DE, the friction braking torque command 24 is increased by an amount ST which corresponds to amount DE. And at time 49, rather than increasing the transmission output torque 14 by an amount GH, the friction braking torque command 24 is decreased by an amount UV which corresponds to amount GH. (Note that at time 87, the transmission output torque 88 at point F is the same as the desired transmission output torque 42, so no adjustment of the friction braking torque command 24 would be called for.) Thus, at multiple points in time during the transitional transmission state 58 (e.g., between times 44 and 52), the friction braking torque command 24 may be modulated so that the resulting vehicle propulsion torque is equivalent to the desired resultant output torque profile 90 (corresponding to segments AJ, JK and KP of the transmission output torque profile 88).

The second coasting situation addressed by the method 100 of the present disclosure is that of TCC release and/or refuel. Similar to the downshift situation, the friction braking torque command 24 is modulated during the TCC release/refuel phase such that a smooth desired resultant output torque 90 for the vehicle propulsion system is achieved. As illustrated in FIG. 4, TCC release/refuel occurs around the region of bracket 62 (between vertical time lines 83 and 85), with a first transition point K at time 53 and a second transition point P at time 55. While the transmission 12 may normally be expected to produce an output torque profile 88 between these times 53, 55 corresponding to line segments KM (line 64), MN (line 66) and NP (line 68), the method 100 of the present disclosure determines a desired transmission output torque transition profile 81 corresponding to line segment KP. Similar to the case with downshifts, at times when the desired output torque 81 is above the expected or actual transmission output torque 88, the friction braking torque command 24 may be decreased by a commensurate amount from the constant or non-constant (i.e., dynamic) friction braking level 57, and when the desired output torque 81 is below the expected or actual transmission output torque 88, the friction braking torque command 24 may be increased by a commensurate amount above the friction braking level 57. For example, at time 83, the desired transmission output torque L is greater than the expected or actual transmission output torque M by an amount LM, so the friction braking torque command 24 is decreased by amount WX that is equivalent to amount LM. Similarly, at time 85, the desired transmission output torque O is less than the expected or actual transmission output torque N by an amount NO, so the friction braking torque command 24 is decreased by amount YZ that is equivalent to amount NO.

A transitional transmission state 59 for the second coasting situation of TCC release/refuel may be defined as the state of the transmission 12 between the first transition point K (before the occurrence of TCC release/refuel) and the second transition point P (after the occurrence of TCC release/refuel). For this second coasting situation, the first transmission state is the state of the transmission 12 before the occurrence of TCC release/refuel, and the second transmission state is the state of the transmission 12 after the occurrence of TCC release/refuel. And for this second coasting situation, the "end" of the first transmission state may be the onset of TCC release/refuel (e.g., at approximately vertical time line 83), and the "beginning" of the second transmission state may be the completion of TCC release/refuel (e.g., at approximately vertical time line 85).

For the first coasting situation (i.e., downshifts), the first transmission state 48 after the first transition point A (vertical line 44), the second transmission state 56 before the second transition point J (vertical line 52), and the transitional transmission state 58 between points A and J (between vertical lines 44 and 52) may occur during DFCO conditions. In other words, for the first coasting situation, the entire transitional transmission state 58 may occur during DFCO. However, for the second coasting situation, DFCO may occur during a part of the transitional transmission state 59, and the transmission 12 may undergo TCC release and/or transition from DFCO to resumption of fuel delivery during another part of the transitional transmission state 59.

One of the advantages of the method 100 of the present disclosure is that it can produce a desired transmission output torque transition profile 42 that is smooth and not limited by the torque capacity of the vehicle's propulsion system. That is, the method 100 can produce a resultant torque profile that might not be producible by the propulsion system alone. This is enabled, at least in part, by leveraging the braking system 16 as an additional torque actuator (i.e., in addition to the torque produced by the transmission 12 and/or powertrain system 10). Another advantage of the method 100 of the present disclosure is that the adjusting or modulation of the friction braking torque command 24, corresponding to the difference between an actual or anticipated output torque $T_{out}$ and a desired output torque $T_{desired}$, may be based on the output torque magnitude/profile at any desired point (or combination of points) along the driveline, including the transmission, the drive shaft, the differential, the axle (or one or both half-axles, as the case may be) and/or the wheel(s). While the description above has focused on a transmission 12 as an example of the driveline or driveline component where actual, anticipated and/or desired output torques may be addressed, the method 100 of the present disclosure applies equally well to other points in a driveline or driveline components, such as differentials, axles, etc. Thus, the drawings herein may be viewed as analogously applying to such additional alternatives. Additionally, while downshifting has been presented as an exemplary application of the method 100, it should be noted that the method 100 of the present disclosure also applies to upshifting as well.

The above description is intended to be illustrative, and not restrictive. While various specific embodiments have been presented, those skilled in the art will recognize that the disclosure can be practiced with various modifications within the spirit and scope of the claims. Moreover, in the following claims, use of the terms "first", "second", "top", "bottom", etc. are used merely as labels, and are not intended to impose numerical or positional requirements on their objects. As used herein, an element or step recited in the singular and preceded by the word "a" or "an" should be understood as not excluding plural of such elements or steps, unless such exclusion is explicitly stated. Furthermore, references to a particular embodiment or example are not intended to be interpreted as excluding the existence of additional embodiments or examples that also incorporate the recited features. Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, such as in the phrase "substantially circular" or "generally circular", these adverbs mean "for the most part", "to a significant extent" and/or "to a large degree", and do not necessarily mean "perfectly", "completely", "strictly" or "entirely".

The flowcharts and block diagrams in the drawings illustrate the architecture, functionality and/or operation of possible implementations of systems, methods and computer program products according to various embodiments of the present disclosure. In this regard, each block in the flowchart or block diagrams may represent a module, segment or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by hardware-based systems that perform the specified functions or acts, or combinations of hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the functions and/or actions specified in the flowcharts and block diagrams.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. A method of operating a powertrain system during coasting operation, the powertrain system including a driveline having a driveline output torque profile, comprising:
   determining a desired driveline output torque transition profile between a first transition point before an end of a first driveline state, and a second transition point after a beginning of a second driveline state; and
   in response to a braking torque request:
   generating a friction braking torque command to operate a friction braking system; and
   adjusting the friction braking torque command during a transitional driveline state between the first and second transition points by an amount corresponding to a difference between a magnitude $T_{out}$ of the driveline output torque profile and a magnitude $T_{desired}$ of the desired driveline output torque transition profile, wherein the adjusting comprises increasing the friction braking torque command when $T_{out}$ is greater than $T_{desired}$, and decreasing the friction braking torque command when $T_{out}$ is less then $T_{desired}$.

2. A method according to claim 1, wherein the driveline comprises one of a step-gear transmission, a dual-clutch transmission, a continuously variable transmission and a manual transmission.

3. A method according to claim 1, wherein the powertrain system comprises one of a hybrid propulsion system and a non-hybrid propulsion system.

4. A method according to claim 1, wherein the braking torque request corresponds to an operator brake pedal position.

5. A method according to claim 4, wherein the operator brake pedal position calls for substantially constant braking during the first driveline state, the second driveline state and the transitional driveline state.

6. A method according to claim 1, wherein the driveline is at least one of a transmission, a drive shaft, a differential, at least one axle and at least one wheel.

7. A method according to claim 1, wherein the powertrain system includes a transmission, wherein in the first driveline state the transmission is in a first gear state, and in the second driveline state the transmission is in an adjacent gear state having a higher gear ratio than the first gear state.

8. A method according to claim 7, wherein the first driveline state after the first transition point, the second driveline state before the second transition point, and the transitional driveline state occur during deceleration fuel cut-off conditions.

9. A method according to claim 1, wherein in the transitional driveline state the powertrain system undergoes at least one of (i) torque converter clutch release and (ii) transition from deceleration fuel cut-off to resumption of fuel delivery.

10. A method of operating a powertrain system during coasting operation, the powertrain system including a transmission having a transmission output torque profile, comprising:
    determining a desired transmission output torque transition profile between a first transition point before an end of a first transmission state, and a second transition point after a beginning of a second transmission state; and
    in response to a braking torque request:
    generating a friction braking torque command to operate a brake-by-wire friction braking system; and
    adjusting the friction braking torque command during a transitional transmission state between the first and second transition points by an amount corresponding to a difference between a magnitude $T_{out}$ of the transmission output torque profile and a magnitude $T_{desired}$ of the desired transmission output torque transition profile,
    wherein the friction braking torque command is increased by $|T_{out}-T_{desired}|$ when $T_{out}$ is greater than $T_{desired}$, and decreased by $|T_{out}-T_{desired}|$ when $T_{out}$ is less than $T_{desired}$.

11. A method according to claim 10, wherein the transmission comprises one of a step-gear transmission, a dual-clutch transmission, a continuously variable transmission and a manual transmission.

12. A method according to claim 10, wherein the powertrain system comprises one of a hybrid propulsion system and a non-hybrid propulsion system.

13. A method according to claim 10, wherein the braking torque request corresponds to an operator brake pedal position calling for substantially constant braking during the first transmission state, the second transmission state and the transitional transmission state.

14. A method according to claim 10, wherein in the first transmission state the transmission is in a first gear state and in the second transmission state the transmission is in an adjacent gear state having a higher gear ratio than the first gear state, and wherein the first transmission state after the first transition point, the second transmission state before the second transition point, and the transitional transmission state occur during deceleration fuel cut-off conditions.

15. A method of operating a powertrain system during coasting operation, the powertrain system including a driveline component having a driveline component output torque profile, comprising:
    determining a desired driveline component output torque transition profile between a first transition point before an end of a first driveline component state, and a second transition point after a beginning of a second driveline component state; and
    in response to a braking torque request:
    generating a friction braking torque command to operate a brake-by-wire friction braking system; and
    adjusting the friction braking torque command at a plurality of time points during a transitional driveline component state between the first and second transition points by an amount at each of the plurality of time points corresponding to a respective difference between a respective instantaneous magnitude $T_{i-out}$ of the driveline component output torque profile and a respective instantaneous magnitude $T_{i-desired}$ of the desired driveline component output torque transition profile, wherein the friction braking torque command is increased by $|T_{i-out}-T_{i-desired}|$ when $T_{i-out}$ is greater than $T_{i-desired}$, and decreased by $|T_{i-out}-T_{i-desired}|$ when $T_{i-out}$ is less than $T_{i-desired}$.

16. A method according to claim 15, wherein the driveline component comprises one of a step-gear transmission, a dual-clutch transmission, a continuously variable transmission and a manual transmission.

17. A method according to claim 15, wherein the powertrain system comprises one of a hybrid propulsion system and a non-hybrid propulsion system, and wherein the driveline component is at least one of a transmission, a drive shaft, a differential, at least one axle and at least one wheel.

18. A method according to claim 15, wherein the powertrain system includes a transmission, wherein in the first driveline component state the transmission is in a first gear state and in the second driveline component state the transmission is in an adjacent gear state having a higher gear ratio than the first gear state, and wherein the first driveline component state after the first transition point, the second driveline component state before the second transition point, and the transitional driveline component state occur during deceleration fuel cut-off conditions.

\* \* \* \* \*